(12) United States Patent
Miyazaki et al.

(10) Patent No.: US 12,138,774 B2
(45) Date of Patent: Nov. 12, 2024

(54) ROBOT

(71) Applicant: Sony Interactive Entertainment Inc., Tokyo (JP)

(72) Inventors: Yoshio Miyazaki, Kanagawa (JP); Kissei Matsumoto, Kanagawa (JP); Hajime Inoue, Chiba (JP)

(73) Assignee: Sony Interactive Entertainment Inc., Tokyo (JP)

( * ) Notice: Subject to any disclaimer, the term of this patent is extended or adjusted under 35 U.S.C. 154(b) by 883 days.

(21) Appl. No.: 16/978,249

(22) PCT Filed: Mar. 12, 2018

(86) PCT No.: PCT/JP2018/009543
§ 371 (c)(1),
(2) Date: Sep. 4, 2020

(87) PCT Pub. No.: WO2019/175936
PCT Pub. Date: Sep. 19, 2019

(65) Prior Publication Data
US 2020/0406482 A1    Dec. 31, 2020

(51) Int. Cl.
*B25J 11/00*    (2006.01)
*B25J 9/16*    (2006.01)
(Continued)

(52) U.S. Cl.
CPC .......... *B25J 11/001* (2013.01); *B25J 9/1694* (2013.01); *B25J 11/0005* (2013.01);
(Continued)

(58) Field of Classification Search
CPC ...... B25J 11/003; B25J 13/087; B25J 9/1694; B25J 19/0054; B25J 11/001; B25J 11/0005
See application file for complete search history.

(56) References Cited

U.S. PATENT DOCUMENTS 6,415,203 B1    7/2002 Inoue
7,333,969 B2    2/2008 Lee
(Continued)

FOREIGN PATENT DOCUMENTS

CN    105643632 A   *   6/2016
CN    106190097 A   *   12/2016
(Continued)

OTHER PUBLICATIONS

International Preliminary Report on Patentability and Written Opinion for corresponding PCT Application No. PCT/JP2018/009543, 13 pages, dated Sep. 24, 2020.
(Continued)

*Primary Examiner* — Devon Russell
(74) *Attorney, Agent, or Firm* — Matthew B. Dernier, Esq.

(57) ABSTRACT

A robot includes heat-generating members such as an actuator in spaces surrounded by exterior members. A heat-transfer section transfers heat of the heat-generating members to the exterior members. A heat-transfer control section adjusts the amount of heat transfer between the heat-generating members and the exterior members by operating the heat-transfer section. The heat-transfer section has a thermally conductive member that can shift between a coupling position for thermally coupling the heat-generating members and the exterior members, and an interrupting position for interrupting thermal conduction between the heat-generating members and the exterior members.

7 Claims, 4 Drawing Sheets

(51) Int. Cl.
   *B25J 13/08* (2006.01)
   *B25J 19/00* (2006.01)
(52) U.S. Cl.
   CPC ......... *B25J 13/087* (2013.01); *B25J 19/0054* (2013.01); *B25J 11/003* (2013.01)

(56) References Cited

U.S. PATENT DOCUMENTS

| | | |
|---|---|---|
| 2003/0067486 A1 | 4/2003 | Lee |
| 2004/0210347 A1 | 10/2004 | Sawada |
| 2014/0219749 A1 | 8/2014 | Kobuchi |

FOREIGN PATENT DOCUMENTS

| | | | |
|---|---|---|---|
| CN | 107598923 A | * | 1/2018 |
| JP | 2001162058 A | | 6/2001 |
| JP | 2003233300 A | | 8/2003 |
| JP | 2003340759 A | | 12/2003 |
| JP | 2004013685 A | * | 1/2004 |
| JP | 2005169509 A | | 6/2005 |
| JP | 2005262401 A | | 9/2005 |
| JP | 2007061962 A | | 3/2007 |
| JP | 2008290249 A | | 12/2008 |
| KR | 20120040429 A | * | 4/2012 |
| WO | 2000067960 A1 | | 11/2000 |
| WO | 2013080280 A1 | | 6/2013 |
| WO | WO-2018008385 A1 * | 1/2018 | ............. A63H 11/00 |

OTHER PUBLICATIONS

Notice of Reasons for Refusal for corresponding JP Application No. 2020-505572, 8 pages, dated Feb. 9, 2021.
International Search Report for corresponding PCT Application No. PCT/JP2018/009543, 2 pages, dated May 29, 2018.
Decision to Grant Patent for corresponding JP Application No. 2020-505572, 5 pages, dated Apr. 30, 2021.

\* cited by examiner (a)

(b)

ROBOT

TECHNICAL FIELD

The present invention relates to robots, and in particular relates to pet-type robots.

BACKGROUND ART

Pet-type robots imitating the appearances of animals are expected to behave in ways to entertain users when interacting with the users. PTL 1 discloses a pet-type robot that behaves autonomously by selecting seeking behavior or knowledge utilizing behavior on the basis of a behavior selection probability. This pet-type robot selects behavior such that a user does not lose interest, by updating behavior values on the basis of rewards for behavior, and deciding a new behavior selection probability.

Citation List

Patent Literature

[PTL 1] Japanese Patent Laid-open No. 2003-340759

SUMMARY

Technical Problem

It has conventionally been known that human beings can derive pleasure or comfort or be healed to reduce stress by communing with animals. Although effects similar to those that can be attained with animals are expected to be attained with pet-type robots that behave autonomously, users do not feel "warmth" that they otherwise can feel by touching animals, since the pet-type robots do not have body temperatures. In view of this, development of the technology for incorporating in robots a mechanism that allows users to feel body temperatures and changes in the body temperatures has been desired.

The present invention has been made in view of such a problem, and an object thereof is to provide a technology of changing the temperature of the exterior of a robot.

Solution to Problem

In order to overcome the problem described above, a robot according to an aspect of the present invention is a robot including a heat-generating member in a space surrounded by an exterior member, the robot including: a heat-transfer section that transfers heat of the heat-generating member to the exterior member; and a control section that adjusts an amount of heat transfer between the heat-generating member and the exterior member by operating the heat-transfer section.

Note that any combination of the constituent elements mentioned above, and any form that is attained by conversion of the expression of the present invention between a method, a device, a system, a computer program, a recording medium having recorded thereon a computer program in a readable format, a data structure and the like are also valid as aspects of the present invention.

DESCRIPTION OF EMBODIMENT

Figure 1:
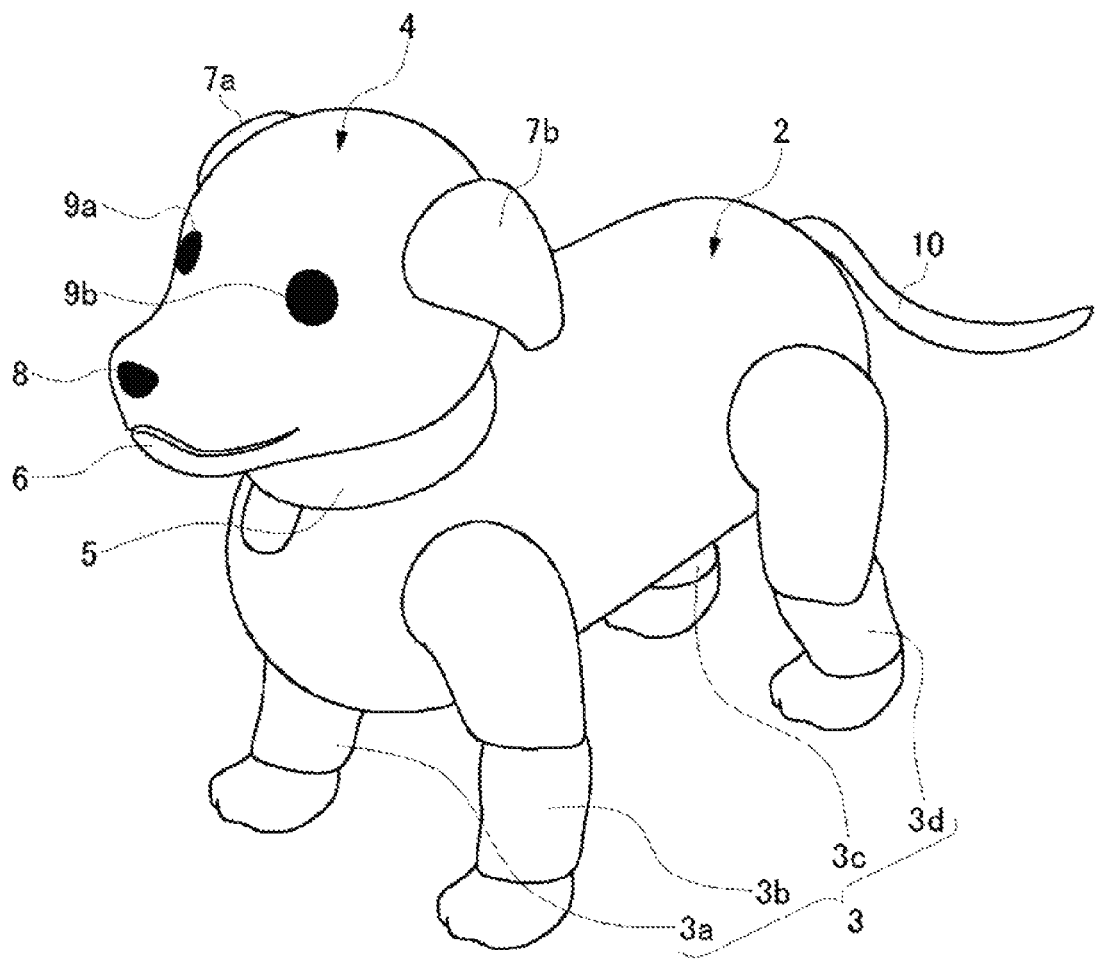
FIG. 1 is a figure illustrating one example of the appearance configuration of a robot according to an embodiment.

FIG. 1 illustrates one example of the appearance configuration of a robot 1 according to an embodiment. The robot 1 is a pet-type robot having an appearance imitating the appearance of a puppy, and has an autonomous behavior function. The robot 1 includes a combination of a plurality of parts, and each part has an exterior member forming the outer surface. The exterior members according to the embodiment includes a material having a high heat-transfer property (hereinafter, called a "heat-transfer material") of transferring heat of heat-generating members that are present in the spaces surrounded by the exterior members to the outer surface in order to make a user feel the temperature and/or temperature changes of the robot 1. Note that although all of the exterior members need not to include a heat-transfer material, portions that are often touched by a user preferably include a heat-transfer material so as to allow the user to feel temperature changes of the exterior surface.

The robot 1 according to the embodiment includes, as parts, a trunk section 2, and a foot section 3, a head section 4, and a tail section 10 that are interconnected with the trunk section 2. The foot section 3 has a right forefoot 3a, a left forefoot 3b, a right hind foot 3c, and a left hind foot 3d, and each of them is pivotably interconnected with the trunk section 2. Each of the foot sections 3 has degrees of freedom along four axes or more, and realizes motions similar to those of dogs. The head section 4 interconnected with a front upper section of the trunk section 2 has a neck 5, a mouth 6, a right ear 7a, a left ear 7b, a nose 8, a right eye 9a, and a left eye 9b. The neck 5 is pivotably interconnected with the trunk section 2, and the mouth 6, the right ear 7a, and the left ear 7b are configured to be movable. The mouth 6 and the nose 8 may have a discharge port(s) formed therethrough. A heat-dissipation fan inside the head section may be intermittently rotation-driven to periodically discharge inside air through the discharge port(s), and express a state that the robot 1 is breathing like a dog does. In addition, the right eye 9a and the left eye 9b may include organic EL (Electroluminescence) displays that generate eye expressions.

The trunk section 2, the foot section 3, the head section 4, and the tail section 10 forming the robot 1 are provided with actuators including motors that form joints. To make motions of the robot 1 resemble motions of a dog more, preferably, each part is provided with a plurality of actuators, and can realize delicate motions. The motors are heat-generating members that generate heat due to current conduction to coils. The robot 1 according to the embodiment makes effective use of the heat generation for expressing the body temperature of the robot 1. Note that the robot 1 may be provided with thermoelectric elements whose temperatures can be controlled, such as Peltier elements, as heat-generating members.

The robot 1 includes various types of sensors such as: a human sensor that senses human beings; a touch sensor that senses a touch; motion sensors including a triaxial acceleration sensor and a triaxial gyro sensor; temperature sensors that sense the temperatures of the exterior members or the heat-generating members; a distance sensor that senses a distance to an object; a microphone through which sounds of the outside world are input; or a camera that captures images of the surrounding environment of the robot. Among these sensors, the temperature sensors are preferably provided to the individual parts in order to sense or estimate the temperatures of the surfaces of the exterior members of the individual parts. In addition, as output functions, the robot 1 has a speaker that outputs sounds, and the organic EL displays that form both eyes.

Figure 2:
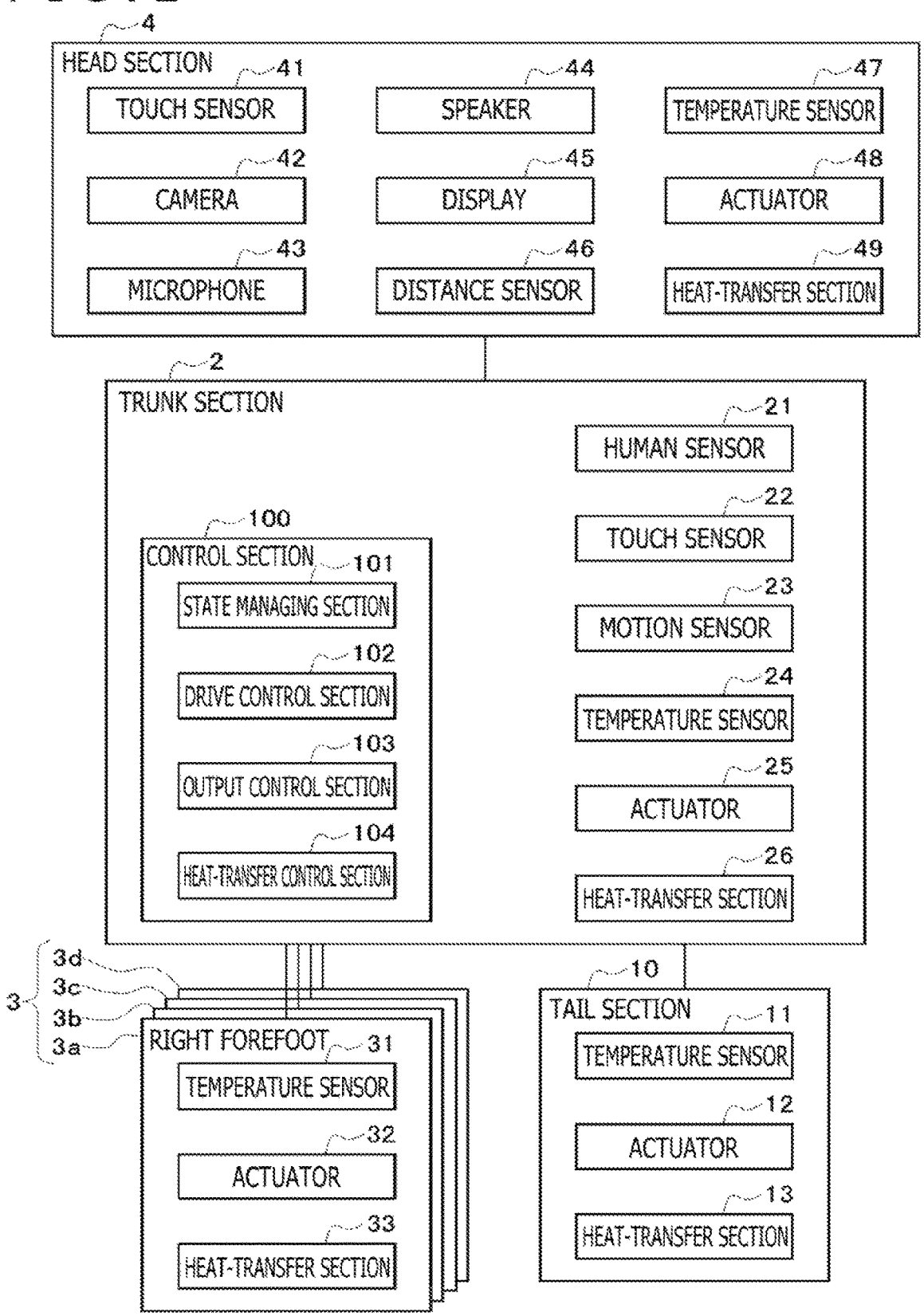
FIG. 2 is a functional block diagram of the robot.

FIG. 2 is a functional block diagram of the robot 1.

The trunk section 2 is provided with: a control section 100 that controls the overall operation of the robot 1, various types of sensors such as a human sensor 21, a touch sensor 22, a motion sensor 23, or a temperature sensor 24; an actuator 25; a heat-transfer section 26; and a battery (not illustrated). The control section 100 has a state managing section 101, a drive control section 102, an output control section 103, and a heat-transfer control section 104.

The control section 100 can include, as hardware, an integrated circuit block, a memory, and other LSIs (Large-Scale Integrations), and is realized with, as software, a program and the like loaded onto the memory. Accordingly, those skilled in the art can understand that these functional blocks can be realized in various forms only by hardware, only by software, or by a combination of hardware and software, and the form for realizing the functional blocks is not limited to any of those forms. In the embodiment, the control section 100 plays a role as a heat-generating member that generates heat due to current conduction to an integrated circuit.

The heat-transfer section 26 has a function of transferring heat generated at the actuator 25 and the control section 100, which are heat-generating members, to the exterior member of the trunk section 2. The heat-transfer section 26 is a mechanically operable member and/or a device, and operation of the heat-transfer section 26 is controlled by the heat-transfer control section 104. The heat-transfer control section 104 adjusts the amount of heat transfer between the heat-generating member and the exterior member by operating the heat-transfer section 26. The configuration of the heat-transfer section 26 is mentioned below.

The head section 4 is provided with a touch sensor 41, a camera 42, a microphone 43, a speaker 44, a display 45, a distance sensor 46, a temperature sensor 47, an actuator 48, and a heat-transfer section 49. Here, the display 45 includes organic displays that form both eyes, but besides this configuration, a display for notifying information to a user may be provided. The right forefoot 3a, the left forefoot 3b, the right hind foot 3c, and the left hind foot 3d at the foot section 3 are each provided with a temperature sensor 31, an actuator 32, and a heat-transfer section 33. The tail section 10 is provided with a temperature sensor 11, an actuator 12, and a heat-transfer section 13. The heat-transfer section 49 at the head section 4, the heat-transfer sections 33 at the foot section 3, and the heat-transfer section 13 at the tail section 10 also transfer heat of heat-generating members to the exterior members, in a manner similar to that of the heat-transfer section 26 at the trunk section 2.

The state managing section 101 manages the state of emotion and/or state of movement of the robot 1.

The state managing section 101 uses emotional parameters that are values in the range of 0 to 100, for example, to express the state (degree) of the robot 1 in individual emotional categories such as "joy," "sadness," "anger," "surprise," or "fear." By using sensing values of the touch sensor 41 at the head section 4 or the touch sensor 22 at the trunk section 2, the state managing section 101 determines whether a contacting action by a user is "stroking" or "hitting," for example. If it is determined that an action is "stroking," the state managing section 101 raises the emotional parameter value of "joy" from the current value, and lowers the emotional parameter value of "sadness" from the current value. On the other hand, if it is determined that an action is "hitting," the state managing section 101 raises the emotional parameter value of "sadness," and lowers the emotional parameter value of "joy."

By using an image of a user captured by the camera 42 or a user sound input to the microphone 43, the state managing section 101 may estimate the emotion of the user. In accordance with the estimated emotion of the user, the state managing section 101 may derive the emotional parameter values of the robot 1. In a case that a behavior criteria for nestling by the user's side is set, the state managing section 101 raises the emotional parameter value of "joy," and lowers the emotional parameter value of "sadness" if a result of estimation indicates that the user is pleased, and, on the other hand, raises the emotional parameter value of "sadness," and lowers the emotional parameter value of "joy" if a result of estimation indicates that the user is sad.

The explanation above is about the categories of "joy" and "sadness," but the state managing section 101 may raise the emotional parameter value of "surprise" if a large sound is input to the microphone 43, and raise the emotional parameter value of "anger" if the user says mean things. In such a way, the state managing section 101 manages the state of emotion of the robot 1, and stores the latest emotional parameter values of the individual categories in the memory.

In addition, the state managing section 101 manages the state of movement of the robot 1 on the basis of the driving state of each actuator 12, 25, 32, or 48 at the drive control section 102, and sensing values of the motion sensor 23. In a manner similar to the management of the state of emotion, the state managing section 101 may use a movement parameter that is a value in the range of 0 to 100, for example, to express the state of movement of the robot 1.

For example, in a case that the robot 1 is moving fast, the state managing section 101 determines that the movement load of the robot 1 is high, and raises the movement parameter value. Conversely, in a case that the robot 1 is moving slowly, the state managing section 101 determines that the movement load of the robot 1 is low, and lowers the movement parameter value. In such a way, the state managing section 101 manages the state of movement of the robot 1, and stores the latest movement parameter value in the memory.

The drive control section 102 controls the driving of an actuator mounted on each part, in accordance with the state of emotion of the robot 1 managed by the state managing section 101. For example, if the emotional parameter value of "joy" is high, the robot 1 expresses joy by wagging the tail section 10 or by other means. The drive control section 102 has a behavior model library in which behavior choices that can be selected according to the state of emotion are set. By selecting behavior according to the latest emotional state managed by the state managing section 101, the drive control section 102 makes the robot 1 behave autonomously.

The output control section 103 controls outputs from the speaker 44 and the display 45. In a case that the robot 1 is set such that the robot 1 can have conversation with a user, the output control section 103 may analyze user sounds input to the speaker 44, and output, through the speaker 44, sounds as a response to the content of utterance of the user. In addition, the output control section 103 may change the screen of the display 45 provided to both eyes, in accordance with the state of emotion of the robot 1.

The heat-transfer control section 104 has a function of adjusting the amount of heat transfer between the exterior members and the heat-generating members that dissipate heat to spaces surrounded by the exterior members. As illustrated in FIG. 2, each part has a temperature sensor, an actuator, and a heat-transfer section, and control of heat transfer at the trunk section 2 is explained in the following as a representative of the parts.

FIGS. 3(a) and 3(b) illustrate the configuration for realizing thermal conduction by the heat-transfer section 26. In the trunk section 2, the actuator 25 and the control section 100 are heat-generating members, and the heat-transfer section 26 transfers heat generated at the heat-generating members to an exterior member 150 of the trunk section 2. By forming the exterior member 150 with a heat-transfer material, the heat is transferred to the exterior surface of the exterior member 150, and a user can feel the warmth and temperature changes of the robot 1 by touching the exterior surface.

The heat-transfer section 26 has: a heat absorbing member 200 that absorbs the heat of the heat-generating members; thermally conductive members 201 that transfer the heat absorbed by the heat absorbing member 200 to the exterior member 150; and interconnecting sections 202 that operably interconnect the heat absorbing member 200 and the thermally conductive members 201. Motive power from a motor is transferred to the interconnecting sections 202, and the heat-transfer control section 104 operates the thermally conductive members 201 by controlling the motor connected to the interconnecting sections 202. Note that the motor connected to the interconnecting sections 202 may be a motor different from the motor of the actuator 25.

FIG. 3(a) illustrates a state that the thermally conductive members 201 are at coupling positions where the thermally conductive members 201 contact the exterior member 150 and thermally couple the heat-generating members and the exterior member 150. FIG. 3(b) illustrates a state that the thermally conductive members 201 are at interrupting positions where the thermally conductive members 201 are separated from the exterior member 150 and interrupt thermal conduction between the heat-generating members and the exterior member 150. The thermally conductive members 201 can rotationally shift between the coupling positions (FIG. 3(a)) and the interrupting positions (FIG. 3(b)) with the interconnecting sections 202 as the fulcrums of the rotational shift.

Figure 3:
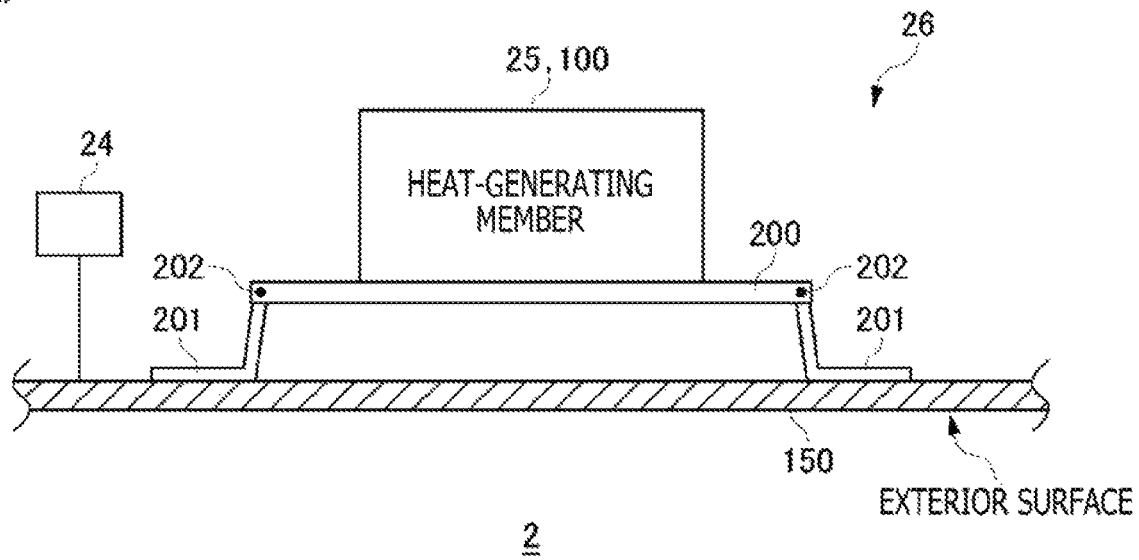
FIG. 3 is a figure illustrating a configuration for realizing thermal conduction by a heat-transfer section.
Figure 3:
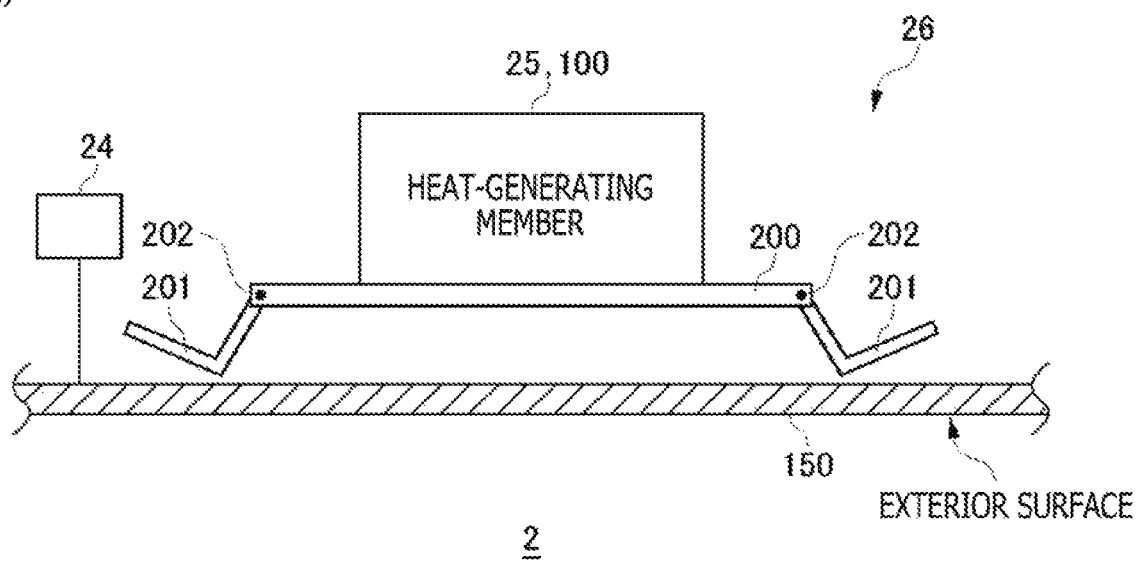

As illustrated, the heat-transfer section 26 illustrated in FIG. 3 has a link mechanism, and the heat-transfer control section 104 shifts the thermally conductive members 201 between the coupling positions and the interrupting positions by operating the link mechanism. Note that the thermally conductive members 201 may be flexible, and configured such that their areas of contact with the exterior member 150 change in accordance with the rotation torque of the motor connected to the interconnecting sections 202. In this case, the heat-transfer control section 104 can control the temperature of the exterior member 150 by adjusting the degree of thermal coupling between the heat-generating members and the exterior member 150 in accordance with the amount of operation of the link mechanism. As illustrated, the temperature sensor 24 measures the temperature of the exterior member 150, and the heat-transfer control section 104 may adjust the amount of operation of the link mechanism such that the measured temperature of the exterior member 150 becomes a desired value.

Figure 4:
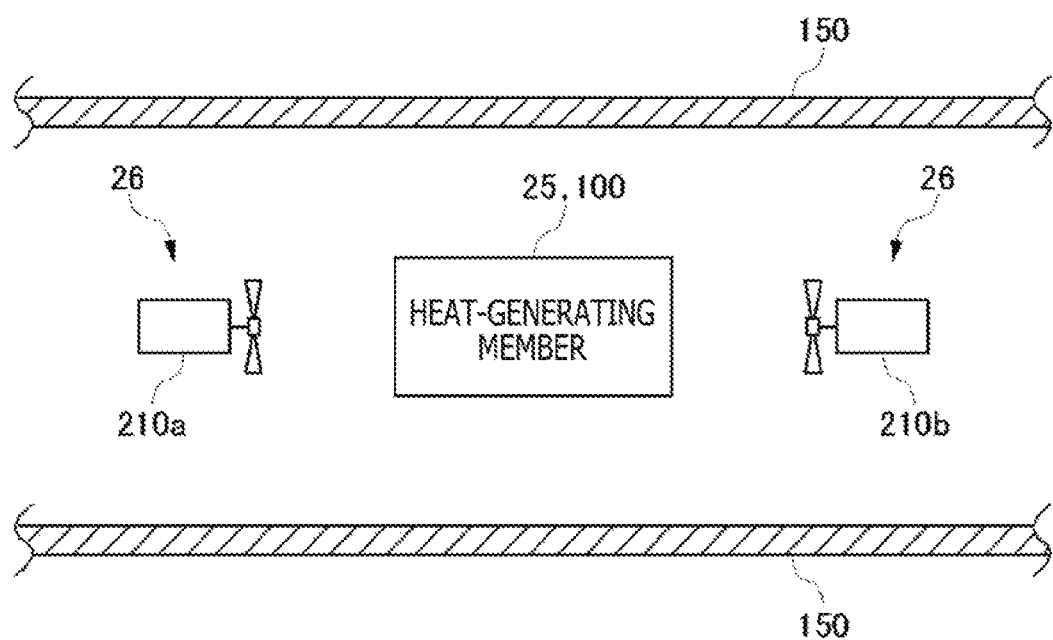
FIG. 4 is a figure illustrating a configuration for realizing heat transfer by a heat-transfer section.

FIG. 4 illustrates a configuration for realizing heat transfer by the heat-transfer section 26. The actuator 25 and the control section 100 are heat-generating members, and the heat-transfer section 26 transfers heat generated at the heat-generating members to the exterior member 150 of the trunk section 2. The heat-transfer section 26 illustrated in FIG. 4 has heat-transfer members 210a and 210b (hereinafter, collectively called "heat-transfer members 210" in some cases) that transfer heat via a fluid (air), and generates the flow of a thermal fluid heated by the heat-generating members. In this example, the heat-transfer members 210 are heat-dissipation fans.

The heat-transfer control section 104 controls the flow of the thermal fluid generated by the heat-transfer members 210. The heat-transfer control section 104 not only can adjust the flow rates of the heat-transfer members 210, but also can adjust the postures of the heat-transfer members 210. By adjusting the postures of the heat-transfer members 210, the heat-transfer control section 104 can control the direction of the flow of the thermal fluid, and can adjust the temperature of a desired position on the exterior member 150. As illustrated, by providing a plurality of heat-transfer members 210 for one heat-generating member, the heat-transfer control section 104 can freely control the direction of the flow of the thermal fluid.

In the robot 1 according to the embodiment, heat generated at the actuator 25 and the control section 100 is effectively used as the body temperature of the robot 1 by using the heat-transfer section 26. Thereby, a user can feel the body temperature and changes in the body temperature of the robot 1, and can derive the feeling as if the user is communing with a real animal. In FIGS. 3 and 4, the heat-transfer structure at the trunk section 2 is explained, and the heat-transfer structures of the other parts are also formed similarly.

Note that although the heat-transfer structures that can realize temperature changes are incorporated in all the parts in the robot 1 according to the embodiment, heat-transfer structures may be incorporated in some limited parts. For example, the heat-transfer structures may be provided only to parts at which a user touches the robot 1 for a relatively long time. Examples of the parts that a user touches for a relatively long time include the trunk section 2 at which the user holds the robot 1, and the head section 4 stroked by the user. In a case that the robot 1 includes the trunk section 2, the foot section 3, the head section 4, and the tail section 10, the trunk section 2 and the head section 4 may be provided with the heat-transfer structures in addition to touch sensors, and the foot section 3 and the tail section 10 may be provided with neither a touch sensor nor a heat-transfer structure.

The heat-transfer control section 104 may control heat transfer by the heat-transfer section 26, in accordance with the state of the robot 1 managed by the state managing section 101. The heat-transfer control section 104 makes a user feel the state of emotion and state of movement of the robot 1 by controlling the temperature of the exterior member 150.

For example, if the emotional parameter value of "anger" among the emotional parameters becomes higher than a predetermined value, the heat-transfer control section 104 may raise the temperature of the exterior member 150. In addition, if the emotional parameter value of "joy" becomes higher than a predetermined value, the heat-transfer control section 104 may lower the temperature of the exterior member 150. In such a way, the heat-transfer control section 104 may change the temperature of the exterior member 150 in accordance with emotional parameter values. A user can deduce the emotion of the robot 1 by feeling temperature changes. In addition, if the movement parameter value becomes higher than a predetermined value, the heat-transfer control section 104 may raise the temperature of the exterior member 150, and if the movement parameter value becomes lower than a predetermined value, the heat-transfer control section 104 may lower the temperature of the exterior member 150.

Although the heat-transfer control section 104 may perform control such that the temperature of the exterior member 150 becomes higher than a predetermined value or lower than a predetermined value, the heat-transfer control section 104 may perform control such that the temperature of the exterior member 150 becomes higher than or lower than the current temperature measured by the temperature sensor 24 by using the measured temperature as a reference temperature. By making the temperature of the exterior member 150 different from the current temperature, a user can feel a state change of the robot 1. Accordingly, in a case that a temperature change is used as an expression of a state change of the robot 1, making the temperature of the exterior member 150 different from the current temperature is an effective way of expression.

Note that the heat-transfer control section 104 may adjust the amount of heat transfer to the exterior member 150 in accordance with the state of the robot 1. For example, a plurality of thresholds may be set for the emotional parameter value of "anger" stepwise in advance, and every time the emotional parameter value rises to be higher than a threshold, the heat-transfer control section 104 may increase the heat transfer amount stepwise, and raise the exterior-surface temperature stepwise.

Note that although the heat-transfer control section 104 may operate each heat-transfer section such that heat of all the heat-generating members is transferred to the exterior member 150 in accordance with the state of the robot 1, the heat-transfer control section 104 may control each heat-transfer section such that only heat of some heat-generating members is transferred to the exterior member 150. That is, the heat-transfer control section 104 may determine heat-generating members to transfer heat to the exterior member 150 in accordance with the state of the robot 1. For example, in a case that the emotional parameter value of "anger" is higher than a predetermined value, the heat-transfer control section 104 may perform heat-transfer control such that only the exterior member 150 of the head section 4 is heated and the exterior members of the other parts are not heated. The robot 1 may be configured to express the state of the robot 1 by a combination of parts to which heat is transferred and parts to which heat is not transferred, and allow a user to feel the state of the robot 1.

Thus far, the present invention is explained on the basis of the embodiment. The embodiment illustrates an example, and those skilled in the art will understand that a variety of modification examples is possible in terms of combinations of individual constituent elements and individual processing processes of the embodiment, and such modification examples are also within the scope of the present invention.

The heat-transfer control section 104 may control the temperature of the exterior member 150 in accordance with the charge amount of the battery. For example, if the charge amount is insufficient, the temperature of the exterior member 150 may be lowered, and if the charge amount is sufficient, the temperature of the exterior member 150 may be raised. In addition, the heat-transfer control section 104 may also perform heat-transfer control in accordance with changes in the postural state of the robot 1. For example, if the robot 1 is held up by a user, the heat-transfer control section 104 may heat the exterior member 150.

Paint whose color changes in response to temperature changes may be applied onto the outer surface (exterior surface) of the exterior member 150. By changing the color of the exterior surface in response to temperature changes, the state of the robot 1 can be expressed on the exterior surface.

REFERENCE SIGNS LIST

1 . . . Robot, 2 . . . Trunk section, 3 . . . Foot section, 4 . . . Head section, 10 . . . Tail section, 11 . . . Temperature sensor, 12 . . . Actuator, 13 . . . Heat-transfer section, 21 . . . Human sensor, 22 . . . Touch sensor, 23 . . . Motion sensor, 24 . . . Temperature sensor, 25 . . . Actuator, 26 . . . Heat-transfer section, 31 . . . Temperature sensor, 32 . . . Actuator, 33 . . . Heat-transfer section, 41 . . . Touch sensor, 42 . . . Camera, 43 . . . Microphone, 44 . . . Speaker, 45 . . . Display, 46 . . . Distance sensor, 47 . . . Temperature sensor, 48 . . . Actuator, 49 . . . Heat-transfer section, 100 . . . Control section, 101 . . . State managing section, 102 . . . Drive control section, 103 . . . Output control section, 104 . . . Heat-transfer control section, 150 . . . Exterior member, 200 . . . Heat absorbing member, 201 . . . Thermally conductive member, 202 . . . Interconnecting section, 210 . . . Heat-transfer member

INDUSTRIAL APPLICABILITY

The present invention can be used in the field of robotics.

The invention claimed is:

1. A machine comprising a body formed of a plurality of body sections, wherein each body section includes:
   an exterior member that forms at least part of an outer surface of the body;
   a touch sensor configured to generate a touch sensing value when the exterior member is touched;
   a heat-generating section arranged in a space surrounded by the exterior member; and
   a heat-transfer section that transfers heat of the heat-generating member to the exterior member;
   and wherein the machine further comprises-a control section that, as to each body section, is controlled to increase and decrease an amount of heat transfer between the heat-generating member and the exterior member by operating the heat-transfer section;
   and wherein
   the controlling to increase and decrease the amount of heat transfer is in response to a change in an emotional parameter value determined by the control section based on the touch sensing value from the touch sensor.

2. The machine according to claim 1, wherein the heat-transfer section has a thermally conductive member that is able to shift between a coupling position for thermally coupling the heat-generating member and the exterior member, and an interrupting position for interrupting thermal conduction between the heat-generating member and the exterior member.

3. The machine according to claim 2, wherein the control section shifts the thermally conductive member between the coupling position and the interrupting position by operating a link mechanism.

4. The machine according to claim 3, wherein the control section adjusts a degree of thermal coupling in accordance with an amount of operation of the link mechanism.

5. The machine according to claim 1, wherein
the heat-transfer section has a heat-transfer member that generates a flow of a thermal fluid heated by the heat-generating member, and
the control section controls the flow of the thermal fluid generated by the heat-transfer member.

6. The machine according to claim 5, wherein the heat-transfer member is a fan.

7. The machine according to claim 1, further comprising:
a temperature sensor that measures a temperature of the exterior member, wherein
the control section adjusts the amount of heat transfer between the heat-generating member and the exterior member such that the temperature of the exterior member becomes a predetermined value.

\* \* \* \* \*